United States Patent
Bergem et al.

(10) Patent No.: US 9,919,902 B2
(45) Date of Patent: *Mar. 20, 2018

(54) SUBSEA HEAVE COMPENSATOR

(71) Applicant: Ernst-B. Johansen AS, Stathelle (NO)

(72) Inventors: Oddbjørn Bergem, Sandefjord (NO); Stian Sannes, Drangedal (NO); Kristian Helland, Stathelle (NO)

(73) Assignee: Ernst-B. Johansen AS, Stathelle (NO)

( * ) Notice: Subject to any disclaimer, the term of this patent is extended or adjusted under 35 U.S.C. 154(b) by 294 days.

This patent is subject to a terminal disclaimer.

(21) Appl. No.: 14/821,428

(22) Filed: Aug. 7, 2015

(65) Prior Publication Data
US 2016/0039644 A1  Feb. 11, 2016

(30) Foreign Application Priority Data

Aug. 8, 2014 (EP) .................................... 14180366

(51) Int. Cl.
| | |
|---|---|
| B66C 23/53 | (2006.01) |
| B66D 1/52 | (2006.01) |
| E21B 19/00 | (2006.01) |
| F16F 9/06 | (2006.01) |
| B63B 27/30 | (2006.01) |
| B65G 67/60 | (2006.01) |

(52) U.S. Cl.
CPC .............. *B66C 23/53* (2013.01); *B63B 27/30* (2013.01); *B65G 67/60* (2013.01); *B66D 1/52* (2013.01); *E21B 19/006* (2013.01); *F16F 9/065* (2013.01)

(58) Field of Classification Search
None
See application file for complete search history.

(56) References Cited

U.S. PATENT DOCUMENTS

| | | |
|---|---|---|
| 3,785,445 A | 1/1974 | Scozzafava |
| 3,793,835 A | 2/1974 | Larralde |
| 3,842,603 A | 10/1974 | Ditzen |

(Continued)

FOREIGN PATENT DOCUMENTS

GB    2503063 A    12/2013

OTHER PUBLICATIONS

Extended European Search Report issued in European Application No. 14180366.8, dated Feb. 18, 2015 (6 pages).

*Primary Examiner* — Paul Yanchus, III
(74) *Attorney, Agent, or Firm* — Osha Liang LLP; Thomas K. Scherer

(57) ABSTRACT

A heave compensator for heavy lifts with adjustable dampening characteristics is able to operate above and below the water line in environmental pressures ranging from the atmospheric up to several hundred atmospheres pressure. A method for automatic regulation of the available stroke length of the heave compensator during the lifting operation, based on the realization that heave compensating devices utilising a slideable piston as a volume expanding mechanism to reduce the tension forces upon relative movements between crane and load, may obtain a simple compact construction able to execute a range of different compensation functionalities by registering the pressure and temperature in the gas filled chambers of the device, and employing this information to regulate the amount of gas in the single gas filled chambers.

20 Claims, 3 Drawing Sheets

(56) References Cited

U.S. PATENT DOCUMENTS

| | | | | |
|---|---|---|---|---|
| 3,946,559 A | * | 3/1976 | Stevenson | ............... E21B 19/09 175/24 |
| 4,188,787 A | * | 2/1980 | Bromell | ................... F15B 1/02 417/217 |
| 2008/0251980 A1 | | 10/2008 | Ormond | |

* cited by examiner

SUBSEA HEAVE COMPENSATOR

FIELD OF TECHNOLOGY

The present invention relates to a heave compensator with adjustable dampening properties for heavy lifting operations able to operate above and below sea level in environmental pressures ranging from about the atmospheric pressure up to several hundred atmospheres pressure, and to a method for automatic regulation of the available stroke length of the heave compensator during the lifting operation.

BACKGROUND

Offshore installations, such as offshore windmills, various process modules for subsea oil and gas exploration etc., are in many cases deployed by being transported on seagoing transport vessels out to the placement location, and thereafter lifted off the transport vessel by an on-board crane or crane located on another vessel and lowered into the sea, either to be located on the surface as a floating installation or lowered into the water to be installed on the sea floor.

The deployment, more precise, the lifting operation is sensitive to the weather conditions since, during suspended loads offshore, sea induced movements of the vessel will quickly become problematic since the movements of the vessel and thereby the crane results in variations in the available lifting height between the sea surface and the crane's point of suspension, and because the cyclic wave movements results in periodic accelerated movements of the suspended load.

This is particularly problematic for lifting of heavy cargoes and/or huge constructions, since the accelerated movements of the suspended load induces huge tension forces/strains on the crane and suspension points in the load and danger of re-contact between the load and the transport vessel which may damage the suspended load. After the load has obtained contact with the sea-water, the waves will become problematic since the sea-water viscosity and own weight retains the load/construction with enormous power when the movement of the vessel tries to increase the distance between sea surface and the suspension point of the crane.

Thus, to avoid costly waiting periods where the transport vessel is laying inactive waiting for improved wave conditions allowing such deploying operations, it is a desire for amending these wave induced problems allowing performing the deployment in less favourable weather conditions. The reduction in costs, due to saved waiting times, increases with increased "weather window". It is thus a need for compensating the variation in available lifting height between the point of suspension of the crane and the surface of the sea due to wave induced movements of the lifting vessel to avoid detrimental tension forces on the crane, the suspended load, or re-contact between the vessel and load.

PRIOR ART

It is known that the problems associated with unintended movements of the crane (and the crane vessel) and subsequent powerful variations in the tension forces on the crane during the lift of heavy loads may be alleviated by employing a heave compensator which, in one end is attached to the clevis on the lifting cable of the crane and in the other end to the suspension point of the load. Sometimes, the heave compensator may be mounted as a part of the lifting device of the ship, instead of having it freely suspended. A heave compensator is a mechanism having a spring and/or dampening effect due to being able, when needed, to prolong or shorten the distance between the suspension point of the crane and the suspension point of the load, and thus substantially reduce the variations of the tension forces due to the crane's unintended movements.

From U.S. Pat. No. 3,785,445 it is known a combined heave compensator for the drill string and a riser tensioner for a floating drilling vessel. The heave compensator is schematically shown in FIG. 2 of U.S. Pat. No. 3,785,445, and comprises a heave compensator cylinder 10 with piston rod 18 connected to the end of the drill string DS enabling the piston of the cylinder to absorb relative vertical movements between the drill string DS and the vessel VS (see FIG. 1 of U.S. Pat. No. 3,785,445). The riser DR is connected to a set of stretching cylinders 26 by cables being stretched by piston 28. The stretch is obtained by the part of the inner space of cylinder 26 below piston 28, chamber 12, is pressurised by a liquid by a piston cylinder having a liquid/gas-piston supplying pressurised liquid to chamber 12 via line 40. The pressure is obtained by gas accumulator 52 supplying pressurised gas to chamber 43 in the piston cylinder. The upper chamber in stretching cylinders 26 is also filled with liquid and is fluidly connected to chamber 12 of the heave compensator cylinder 10 via line 30 with an isolation valve 32 and safety valve 34. By interchanging liquid between chamber 12 in the heave compensating cylinder and upper chamber in the stretching cylinders 26, the pistons 18 and 28 in the heave compensating cylinder 10 and the stretching cylinders 26, respectively, obtain a motion pattern where every piston 18, 26 are moved in the same phase. Thus, a simultaneous compensation of the tension forces on the drill string DS and an adjustment of the stretching of the riser DS is obtained in accordance with the vertical movements of the drilling vessel DV due the waves.

From U.S. Pat. No. 3,793,835 it is known a heave compensator for the drill string of floating drill vessels comprising two heave compensating cylinders 13 with piston 14 connected to the drill string, and where piston 14 separates the inner space of cylinders 13 into an upper chamber and a lower liquid filled chamber. The lower liquid filled chamber is fluidly connected to the liquid phase 15 of liquid/gas accumulator 17 via line 18, 20 with shut-off valve 19. The gas phase of liquid/gas accumulator 17 is via line branched line 31 with shut-off valves 32 and 33, fluidly connected to a battery of gas tanks 30, 30a. The pressure of the system is pre-set according to the expected weight on the drill string. By valves 32 and 33, it is possible to vary the number of gas tanks to increase or reduce the available expansion volume to the gas phase, and thus adjusting the dampening characteristics of the heave compensator.

From U.S. Pat. No. 3,842,603 it is known a heave compensator intended for lifting loads by a crane from a floating vessel and lowering the load into the sea, which comprises a heave compensating piston cylinder 12 divided by piston 16 into an upper chamber 19 and a lower chamber 18. Piston 16 is connected to the load via piston rod 17. The lower chamber 18 is filled with liquid and is fluidly connected to the liquid phase of a first liquid/gas accumulator 22 via conduit 21 having a valve 43. Shut-off valve 43 is controlled manually by switch 53 which electrically controls the actuator 44, and may vary between closed and open position. The upper gas filled chamber in the first liquid/gas accumulator 22 is through conduit 24 fluidly connected to a gas supply conduit 28 having an electrically activated shut-off valve 26, and which is connected to a reservoir 31 for pressurised gas, and fluidly connected to gas exit 34 having electrically controlled cur-off valve 32. It is thus possible to increase the gas pressure in the gas filled chamber in the first liquid/gas accumulator 22 by opening valve 26 and maintain valve 32 closed, or the opposite, to reduce the gas pressure by closing valve 26 and opening valve 32, and in this manner, increase or reduce the pressure of the liquid of the liquid phase pressing against the piston 16 in chamber 18. The upper chamber 19 of piston cylinder 12 is also filled with liquid and is fluidly connected to a liquid phase 38 of a second liquid/phase accumulator 37 via conduit 36 having an orifice 41. The upper gas filled chamber in the second accumulator 37 is equipped with two pressure sensitive switches 59 and 62, which are electrically connected to electric actuator 27 of valve 26 and electric actuator 33 of valve 32. Pressure sensitive switch 59 will engage electric actuator 27 if the pressure in the upper gas filled chamber of the second accumulator becomes lower than a pre-set threshold value, and thus, pressurised gas from reservoir 31 begins to flow into accumulator 22, which has the effect of increasing the pressure in the liquid in the chambers 23 and 18 until piston 16 is moved upwards in cylinder 12, and thus reducing the volume of chamber 19 which again presses liquid into the first accumulator 37 causing an increase in the upper gas filled chamber of the first accumulator until the pressure regains the pre-set threshold value. Then the pressure sensitive switch will engage the electric actuator 27 to close the gas inlet 28 of the first accumulator. In this manner, the position of piston 16 is automatically readjusted if the load drags it tom much downwards in the cylinder 12. Pressure sensitive switch 62 will engage the electric actuator 33 if the pressure in the upper gas filled chamber of the second accumulator 37 exceeds a pre-set threshold value (as a consequence of the piston having moved too far up in the cylinder 12) such that the gas exit 34 is opened to lower the pressure in the accumulator 22 and thus allow the load to drag the piston 16 a distance further down in cylinder 12 and the pressure in the upper gas filled chamber of the second accumulator to regain its threshold value. Then switch 62 will engage electric actuator 33 to close the gas exit. In this manner, a heave compensator with automatic correction of the piston position in the heave compensating cylinder is obtained.

When deploying offshore installations and other heavy and/or voluminous objects from a floating vessel down into deep water, there is a need for a heave compensator which may fully automatic, or by initiation by a ROV, rectify variations in the loads and change the dampening characteristics in order to maximise the compensating abilities during the different phases of the lifting deployment, and in this manner increase the weather window allowing performing deployment of installations offshore from floating vessels. It is further an advantage that the heave compensator has a simple compact design, and that the heave compensator may function without knowing in advance the exact weight of the load and/or its buoyancy when lowered into the sea.

OBJECTIVE OF THE INVENTION

The objective of the present invention is thus to provide a heave compensating device which may operate above and submerged in water in environmental pressures ranging from atmospheric pressure to several hundred atmospheres pressure.

It is further an objective to provide a method for automatic regulation of the available stroke length of the heave compensator over and below sea level in environmental pressures ranging from the atmospheric pressure to several hundred atmospheres pressure and which automatically compensates for variations in the sensible weight of the load.

LIST OVER FIGURES

DESCRIPTION OF THE INVENTION

Figure 1:
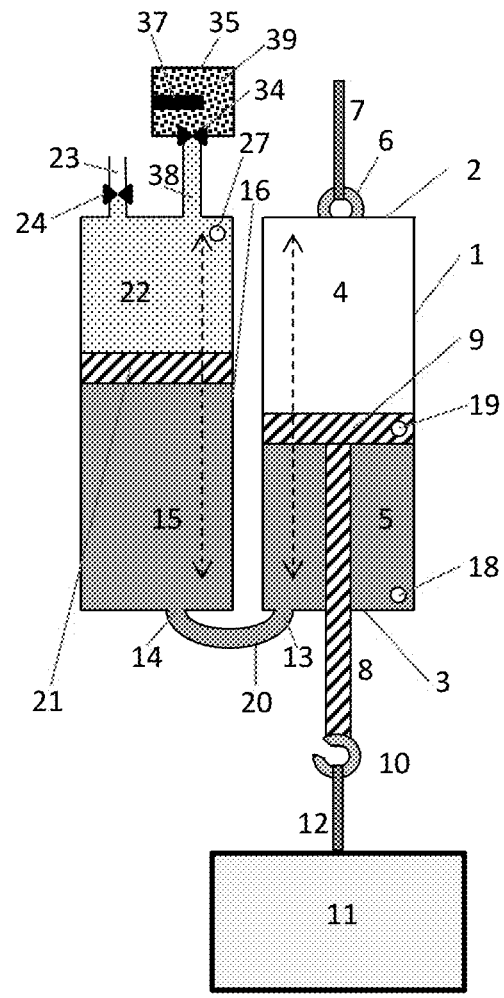
FIG. 1 is a schematic drawing seen from the side of an example embodiment of a heave compensator according to the invention.

The present invention is based on the realisation that heave compensating devices utilising a slide-able piston as a volume expanding mechanism to reduce the tension forces upon relative movements between crane and load, may obtain a simple compact construction able to execute a range of different compensation functionalities by registering the pressure and temperature in the gas filled chambers of the device, and employing this information to regulate the amount of gas in the single gas filled chambers.

In a first aspect, the present invention relates to a heave compensating device for compensating heave movements between a lifting device and a load lifted by the lifting device, characterised in that the device comprises:
an elongated length extension device (1) comprising:
side walls,
a closed upper end (2),
a lower end (3) having an opening for a piston rod and a liquid outlet (13),
an inner space divided by a slide-ably first piston (9) into an upper vacuum chamber (3) and a lower first liquid filled chamber (5),
a piston rod (8) of length at least equal to the length of the length extension device, and which in one end is attached to the first piston, and where the piston rod stretches through the first liquid filled chamber and further out through the opening in the lower end (3) of the length extension device,
means (10) arranged at the second end of the piston rod for releasable attachment of a load (11), and
means (6) arranged at the upper end (2) of the length extension device for releasable attachment of a lifting device (7),
an elongated gas accumulator (16) comprising:
an upper end having a, with a valve (24), regulated gas outlet (23),
a lower end having a liquid outlet (14), transfer device (20), and
an inner space divided by a slide-able piston (21) into an upper chamber (22) and a lower liquid filled second chamber (15),
a regulated liquid transferring device (20) fluidly connected to liquid outlet (13) and liquid outlet (14),
activation means for selective opening or closure of valve (24),
a first and second measuring means (18, 27) for measuring the temperature and/or pressure of the liquid in at least one of the liquid filled first and second chamber (5, 15) and the gas of the upper chamber (22), respectively, and eventually a third measuring means (19) for measuring the position of the first piston (9),
a reserve gas tank, comprising:
   a pressure resistant container (35) containing an adjustable heat source (35) and a thermally degradable compound (39) in liquid or solid state, and
   a, with a valve (34), adjustable gas transmission device (38) fluidly connected to the upper chamber (22),
and
a control unit comprising:
   means for registering the measured temperatures and/or pressures to the liquid in one of or both the first and second liquid filled chamber (5, 15) and the gas in the upper gas filled chamber (22), respectively, and eventually the position of the first piston (9),
   means for calculating the real equilibrium position to the first piston (9) from the registered temperatures and/or pressures, and eventual registered positions of the first piston (9),
   means for calculating the amount of gas which needs to be ventilated out of the first outlet (23) in order to obtain an intended equilibrium position of the first piston (9),
   means for calculating the amount of gas which is present in the upper gas filled chamber (22) of the gas accumulator, and
   engaging means for engaging the activating means of valve (24) of the first gas outlet (23) such that the intended amount of gas exits through the first gas outlet and the first piston (9) obtains the intended equilibrium position.

The reserve gas reservoir may contain any liquid or solid thermally degradable compound which upon heating, decomposes to one or more gaseous compounds at the pressures and temperatures arising in heave compensators, i.e. up to 200-300 bars at room temperature. The term "thermally degradable compound" is in this context to be understood as a chemical compound which is decomposed by heating and forms at least one chemical compound in the gaseous or supercritical phase and/or which undergoes a phase transition from a solid or liquid phase to a gas- or supercritical phase by the heating. Cryogenic fluids in liquid phase, preferably liquid air or liquid nitrogen, is suited as thermally degradable compounds in the reserve gas reservoir. When using cryogenic liquids, the pressure resistant container may advantageously include a ventilation discharge to avoid dangerous pressure increases.

The heating source may be any adjustable heat source which upon request may produce sufficient heat to convert the thermally degradable compound in the container to gas phase. An example of a suited heat source is an electric resistivity element connected to source of electricity being regulated by the control unit of the device according to the first aspect of the invention. In the example embodiment shown in FIG. 1, the reserve gas tank (35, 37, 39) is arranged fluidly connected to upper chamber (22) of the gas accumulator.

The weight of the load tends to pull the piston towards the lower end of the length extension device when the load is suspended in the piston rod. As long as the valve on the liquid transferring device is open, a sufficient amount of gas to set up a gas pressure in the upper chamber of the gas accumulator which is at least equal to the pressure of the liquid in the liquid filled second chamber arising from the loads pull on the first piston, is required to counter this movement. This amount of gas may either be stockpiled in advance (before starting the lifting operation) in the upper chamber of the gas accumulator or be introduced into the chamber when necessary from an external source. The external gas source may be a gas tank connected to the upper chamber of the gas accumulator.

The heave compensating device according to the first aspect of the invention may in one embodiment additionally comprise:
   a gas tank (28) comprising:
      an upper end having a, with a valve (30), adjustable second gas outlet (25),
      a closed lower end, and
      an expansion chamber (29),
   a fourth measuring means (31) for measuring the temperature and/or pressure of the gas in the expansion chamber (29),
   a gas transferring device (26) fluidly connected to the first (23) and the second (25) gas outlet,
   a, with a valve (33), adjustable third gas outlet (32) to the environment fluidly connected to the gas transferring device, and
   activation means for selective opening or closure of one or both of valve (30) and valve (32),
wherein
   the means of the control unit for registering the measured temperatures and/or pressure, and eventually the position of the piston in the length extension device, are a signal receiver unit (101) receiving the signals from the first, second, and fourth measuring means (18, 27, 31) and eventually the third measuring means (19) and a data storage memory (102),
   the means of the control unit for calculating the equilibrium position of the first piston (9) comprises a data processing unit (104) containing computer software with instructions when executed calculates the amount of gas present in the upper gas filled chamber (22) and/or the expansion chamber (29) by use of a gas equation of state and the registered temperatures and pressures,
   the engaging means of the control unit for engaging the activation means comprises a signal transmission unit (105) for transmission of guidance signals to the activation means of one or more of the first, second, third, or fourth valve (17, 24, 25, 33), and where
   the data processing unit (104) of the control unit contains one or more computer software modules each having a set of instructions which will calculate, according to a desired compensation functionality, a desired amount of gas in the upper gas filled chamber (22) and/or a desired amount of gas in the expansion chamber (29), and which thereafter activates the engaging means of the control unit such that the desired amount of gas in the upper gas filled chamber (22) and/or the expansion chamber (29) is obtained.

In an advantageous example embodiment, the length extension device according to the first aspect of the invention, is an elongated cylinder having an elongated inner space where the slide-able first piston (9) is located in the inner elongated space of the cylinder,
   the means for attachment of the length extension device to the lifting device comprises a hook (6) located on the outside of the first end of the cylinder, and where the cylinder comprises:
   a piston rod (8) arranged in parallel with the centre axis of the cylinder, and which:
      in one end is mechanically attached to the slide-able first piston, extands from the first slide-able piston, out through the opening in the other end of the cylinder, and further a distance, and which at the other end has attachment means (10) for releasable attachment of a load (11), and where the opening in the other opposite end is adapted to form a fluid tight closure around the piston rod.

The measuring means (18, 27, 31) for measuring the temperature and/or pressure of the liquid in at least one of the liquid filled first and second chamber (5, 15), the gas in the upper chamber (22), and the gas in the expansion chamber (2), respectively, may advantageously be a pressure and temperature sensor.

The gas accumulator may also, in an example embodiment, have the designed of an elongated cylinder having an elongated inner space in which the second slide-able piston is located, that is, the gas accumulator is an elongated cylinder (16) with an elongated inner space containing and being divided by the slide-able piston (21) into the upper chamber (22) and the liquid filled lower chamber (15).

The term "position sensor" as used herein, is to be understood as any mean able to determine the position of one or both pistons of the device, and feeding this information as an electric readable signal to the control unit of the device for determination of the position of the first slide-able piston in the length extension device. The position sensor may be located on any suited location in the device, included but not restricted to, in the first slide-able piston. A position sensor is advantageous, but not absolutely required; the device may in almost all cases calculate the position of the slide-able piston by determining the amount of gas in the gas accumulator from the information of the pressure and temperature of the gas.

The term "pressure and temperature sensor" is in this context, any sensor able to produce an electric signal representative of the pressure and temperature in the pressure and temperature range which may arise in the different chambers of heave compensators and their environments, and which may transfer this information via electric transfer means to a signal receiving unit for further treatment. The sensor may be a combined pressure and temperature sensor, or alternatively a separate pressure sensor and a separate temperature sensor. The invention is not tied to use of any specific sensor, but may apply any known sensor able to measure the actual pressures and/or temperatures. Examples of suited sensors includes, bur are not restricted to; PTX 300 Series from GE, PTX 400 Series from GE, HYDAC ETS Series, HYDAC HDA Series, etc.

The term "valve" is in this context any valve able to shut-off and opening a conduit from zero to full throughflow of fluid in the conduit. The valve may be a shut-off valve, i.e. a valve which either is open or closed, a throttle valve which may continuously regulate the cross-section of the conduit for fluid from zero to 100% opening, or any other type of valve. Due to the large pressure differences that may arise in heave compensators, it may be advantageously be employed a by-pass conduit with a pressure equalising valve across each valve in the heave compensator (i.e. valves 24, 30, and 32) to be able to equalise the pressure difference gradually in a controlled manner, and thereafter opening the one or more of the respective valves 24, 30, and 32 for full through-flow.

Figure 2:
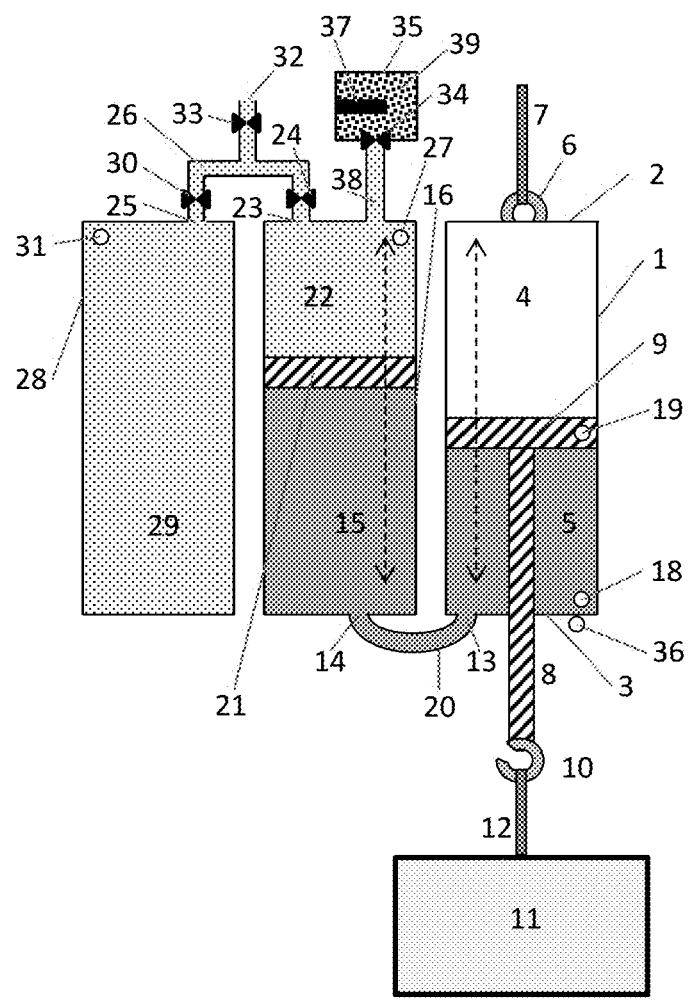
FIG. 2 is a schematic drawing seen from the side of second example embodiment of a heave compensator according to the invention.

An example embodiment of a heave compensating device according to the first aspect of the invention which utilises a cylinder having a slide-able piston as length extension device, a gas accumulator, a gas tank, and a reserve gas reservoir is schematically illustrated in FIG. 2. This example embodiment is not to be interpreted as a limitation of the scope of the invention. It is envisioned other example embodiments which utilises more than one cylinder 1, gas accumulator 16, and/or gas tank 28.

The extension device shown in FIG. 2 comprises a cylinder 1 having a first end 2 and an opposite second end 3. The inner space of the cylinder 1 is divided into a vacuum chamber 4 and a liquid filled chamber 5. The liquid may advantageously be glycol based liquids such as i.e. the liquid sold under the trade mark Houghto Safe 105 or 273 CF; however, the present invention may apply any non-compressible liquid with sufficient low freezing point and high boiling point to avoid phase transformations at the pressures and temperatures that may arise in heave compensators.

The cylinder 1 according to this example embodiment, is at a first end equipped with a hook 6 for attachment to the lifting cable of the lifting device 7 (the lifting device is not shown). In the other end 3 of cylinder 1, a piston rod 8 is protruding out of the cylinder. Piston rod 8 is in one end attached to a slide-able piston 9 and has in the other end a hook 10 for releasable attachment of a load 11 by use of a load attaching cable 12 or the like. Lifting cable 7, piston rod 8, and load attachment cable 12 are arranged along the centre axis of cylinder 1, such that when the slide-able piston 9 changes position inside the cylinder 1, the vertical length between the suspension point 10 of the load and the suspension point of the lifting device 6 will vary, and thus compensate for heave movements during lifting of the load. The slide-able piston 9 is equipped with a position sensor 19 which continuously or at regular intervals registers the position of the piston inside cylinder 1 and transfers this information to the signal receiving unit (not shown). A first pressure and temperature sensor 18 is located in the first liquid filled chamber 5 which continuously or at regular intervals register the pressure and/or temperature of the liquid in the liquid filled chamber 5, and transfers the information to the signal receiving unit.

At the other end 3 of cylinder 1 according to this example embodiment, there is a liquid outlet 13 which is connected to a liquid outlet 14 of a second liquid filled chamber 15, via a conduit 20, to a second cylinder 16. Cylinder 16 is a gas accumulator where the inner space is fluid tight divided by a slide-able piston 21 into the second fluid filled chamber 15 and a first gas filled chamber 22. The first gas filled chamber 22 has a first gas outlet 23 equipped with a second valve 24 which may, via electric activation means (not shown), be regulated to any position from 100% closure to full opening of conduit 23. The first gas outlet 23 is via a gas transferring device 26 which i.e. may be a conduit, a gas manifold etc. or the like, connected to a second gas outlet 25. The second gas filled chamber 22 has a second pressure and temperature sensor 27 which continuously or at regular intervals registers the pressure and/or temperature of the gas in the chamber and transfers this information to the signal receiving unit.

Gas tank 28 comprises an inner expansion chamber 29 with a gas outlet 25. Gas tank 28 may advantageously be cylindrical in order to better enable storing of gas in expansion chamber 29 at high pressures, however, any design of the gas tank 28 able to withstand storing gas at up till 400 bar may be applied in the present invention. The second gas outlet 25 is equipped with a third valve 30 which may be, via electric activation means (not shown), regulated continuously to any position from 100% closure to full opening of the second gas outlet 25. A third pressure and temperature sensor 31 is located inside expansion chamber 29, and which continuously or at regular intervals, registers the pressure and/or temperature of the gas in the expansion chamber and transfers this information to the signal receiving unit.

The gas transferring device 26 has a third gas outlet 32 leading out to the surroundings of the heave compensator. The third gas outlet 32 is equipped with a fourth valve 33 which may be regulated continuously to any position in order to regulate the amount of gas flowing through the third gas outlet to any position from 100% closure to full opening of the third gas outlet by electric activation means (not shown). The third gas outlet may be applied for ventilating gas from the gas accumulator 18 and/or the gas tank 28, and it may advantageously include means (not shown) for connecting the outlet to an external gas source for accumulating gas in the gas accumulator 16 and/or the gas tank 28.

Figure 3:
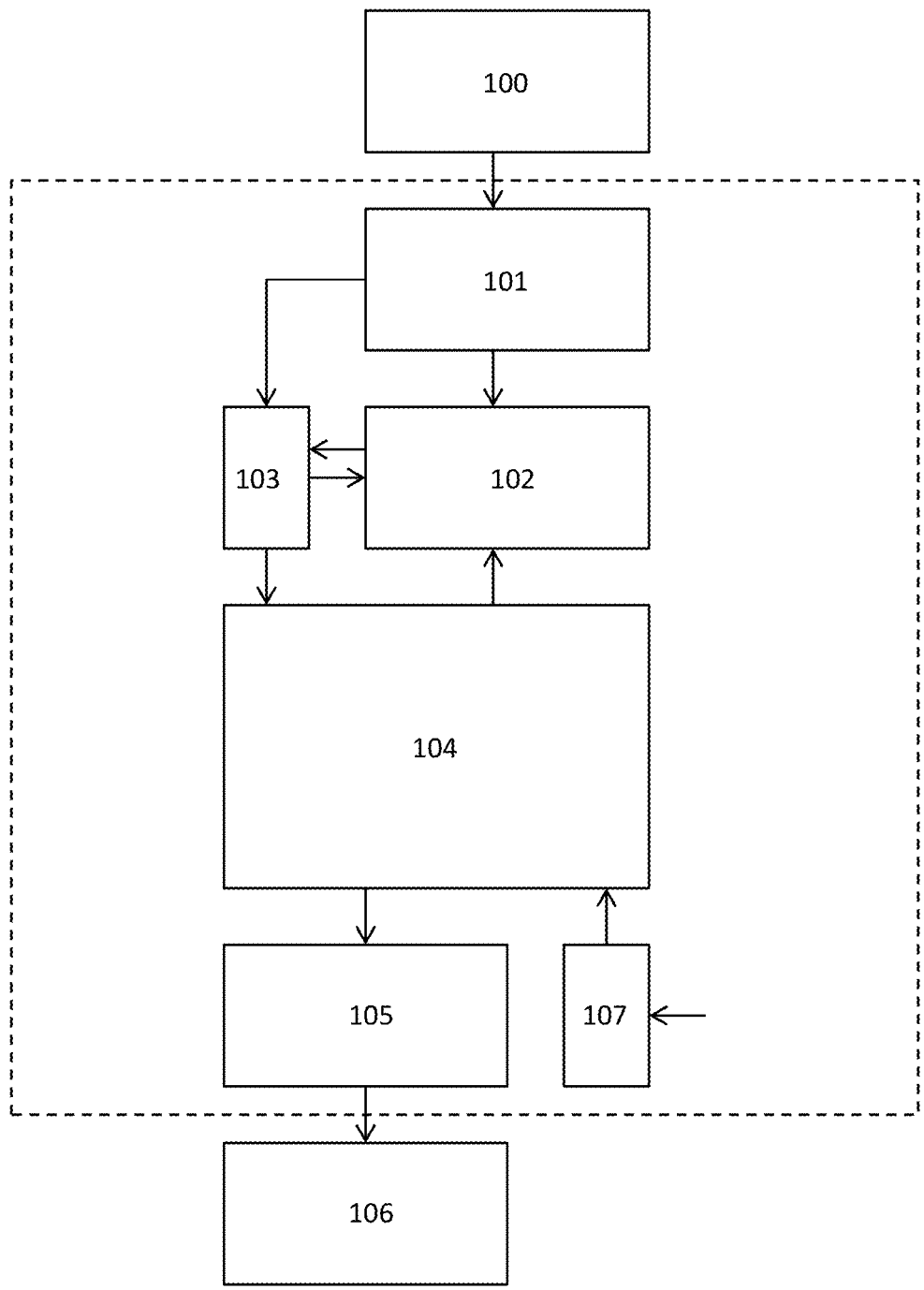
FIG. 3 is a box diagram showing an example embodiment of the components of the control unit, and how they are connected together.

An example embodiment of a suited control unit is shown schematically in FIG. 3.

In the figure, the different constituents of the system are shown schematically as boxes. Each box with non-broken line located inside the large box with broken line represents a physical part belonging to the control unit, while the two boxes with non-broken line located outside of the box with broken line represents one or more physical parts located in other areas of the heave compensator in communication with the control unit.

The box marked with reference number 100 represents the set of sensors in the heave compensator measuring the pressure, temperature and positions of the piston of the length extension device. These comprises at least one pressure and temperature sensor located in the liquid filled chamber of each length extension device being employed in the heave compensator, at least one pressure and temperature sensor located in the first gas filled chamber of each gas accumulator being employed in the heave compensator, at least one pressure and temperature sensor located in the gas filled chamber of each gas tank being employed in the heave compensator, and at least one sensor measuring the position of the slide-able piston in at least one of the length extension devices being employed by the heave compensator. In one example embodiment of the invention, the box 100 may additionally comprise at least one or more pressure and temperature sensor(s) measuring the pressure and temperature of the surroundings of the heave compensator. The sensors produce electric signals which are representative for the variable being measured at regular intervals or continuously, and transmit them via electric conducting means as a stream of raw data (depicted schematically with an arrow on the figure) to a analogous signal receiving unit 101.

The signal receiving unit 101 receives the stream of raw data from each sensor of the heave compensator and copies them to make a duplicate stream of raw data, where one of the copied streams is passed on to a computer storage of type computer memory chip/logging module 102 which chronically registers the incoming data stream form each sensor, and where one of the copied streams is passed on to a signal treatment unit 103.

The signal treatment unit 103 processes the incoming raw data stream from each sensor connected to the signal receiving unit 101 of the control unit to reduce the signal noise. The processed raw data from each sensor is then transferred consecutively as a stream of processed data of the pressure and temperature in the respective fluid filled chambers of the heave compensator, the position of the piston of the length extension device, and/or the pressure and temperature of the surroundings of the heave compensator to the logging module 102 where they are logged chronologically. A similar stream of processed data is passed on to a data processing unit 104. This may be accomplished by the signal treatment unit described above, or by any other signal treatment unit capable of performing the same tasks.

In addition, the signal treatment unit will continuously, or alternatively at regular intervals, process the processed data or alternatively the raw data form the position sensor of the length extension device to determine the equilibrium position of the piston at the actual moment. This information will also be passed on to the logging module 102, which registers it chronologically and to the data processing unit 104 which applies the information to determine the need for regulating the equilibrium position of the piston.

The data processing unit 104 receives a stream of processed signals from every sensor which provides real time information of pressures and temperatures in the respective fluid filled chambers of the heave compensator, and eventually of its surroundings, and the equilibrium position of the piston of at least one length extension devices of the heave compensator. The data processing unit will determine, by use of a suited gas equation of state and information of the intended functionality of the heave compensator, determine the size of the gas expansion volume which should be made available and which pressure the gas should have at the actual temperature (i.e. determine the amount of gas inside the available volume) to adjust the dampening characteristics and/or adjust the equilibrium position of the piston of the length extension device. The data processing unit 104 will thereafter sending electric guidance signals to a signal transmission unit 105, which via electric transmission means, is connected to one or more of the activation means on the first, second, third, and/or forth valve and eventually to the pressure compensating means across these valves. The signal transmission unit 105 passes on the guidance signal from the data processing unit 104 further to the respective activation mean(s) for regulation of the valve's position. As a consequence, gas will either flow in or out of the outlet of the respective chamber and thus that the pressure, and in some cases also the temperature, in the respective gas filled chamber(s) is changed.

The data processing unit 104 receives, continuously or at regular intervals, information of changes in the pressure and eventually the temperature in the respective gas filled chamber(s) by way of the incoming stream of processed data from the signal treatment unit 103, and will continuously compare the measured pressure and temperature in the respective gas filled chamber(s) with the calculated desired pressures and temperatures. Guidance signals will be transmitted accordingly to the respective activation means for either maintaining or ending the regulation of the gas amounts and pressures in the respective gas filled cambers.

The signal transmission unit 105 is, via electric transmission means (shown schematically as an arrow to box 106 in the Figure), connected to every activation mean for engagement of a valve and pressure compensating valve present in the heave compensator. The activation means are schematically illustrated as box 106 in FIG. 2, and comprise at least one activator for the valve on the gas outlet of the gas filled chamber of each of the at least one gas accumulator being employed in the heave compensator, at least one activator for the valve on the gas outlet of the gas filled chamber of each of the at least one gas tank being employed in the heave compensator, and at least one activator for the valve on the third gas outlet (to the surroundings of the heave compensator). In example embodiments involving a by-pass conduit across one or more of the above-mentioned valves, the activation means of these pressure compensating valves are also connected, via electric transmission means, to the signal transmission unit 105.

Alternatively the heave compensating device may be equipped with a radio signal receiver 107, or alternatively a wire-based transmitted signal receiver, for receiving external guidance signals which trigger the execution of the different sub-routines in the data processing unit.

One premise for the functioning of the heave compensating device is that it has access to sufficient amounts of gas to form a gaseous phase in the first gas filled chamber with an adequate pressure and volume to be able to obtain an equilibrium position of the first piston of the length extension device during the entire lifting operation. The required amount of gas for the functioning of the heave compensating device must either be accumulated in the device in advance (before initiating the lift) or be obtained by connecting the device to an external gas supply which supplies the gas on demand. In case of employing an external gas supply, it may i.e. be connected to the third gas outlet located on the gas transferring device, or alternatively, the expansion chamber of the at least one gas tank may be equipped with a gas inlet connected to an external gas source. However, accumulation of gas is usually performed during preparation of the heave compensating device for a lifting operation.

From a practical point of view, it is of great advantage to be able to avoid taking consideration to external connection means for gas supply during the lift. This is especially pertinent for offshore lifts where the load is to be placed on the sea bed. It is thus advantageous to accumulate sufficient gas resources in the heave compensating device in advance of the lifting operation. This may easily be obtained by connecting an external gas supply to the third gas outlet and make use of the valves of the first, second and third gas outlet, respectively, to ensure that the external gas supply pumps the required amount of gas into the expansion tank of at least one of the gas tank(s). The required amount of gas depends on the weight of the load and the volume of the inner space of the length extension device. There is however, an asymmetry in the system since the system is at least able to discharge gas (as long as it is not submerged in deep water) when needed, but depends on access to accumulated gas to increase the pressure of the chamber. It is thus an advantage to over-estimate the need for gas to ensure that sufficient gas resources are accumulated before initiating the lifting operation.

The device according to the first aspect of the invention may advantageously include a fourth valve downstream of the third valve acting as a "watch dog" on the third gas outlet (the discharge outlet to the surroundings).

During heavy lifts there may arise relatively huge pressure differences of several tens of bars or more over the first, second, third, and/or fourth valve. In one embodiment, the invention according to the first aspect may thus advantageously include a by-pass conduit with a pressure compensating valve over one or more of the first, second, third, and/or fourth valve in order to regulate the pressure equalising between the chambers of the device in a soft and controlled manner before opening the valve of the respective gas or liquid inlet/outlet.

In another embodiment the invention according to the first aspect may advantageously include a fourth pressure and temperature sensor which measures the pressure and temperature of the surroundings of the device (the temperature and pressure of the air or water) and which passes the measured data to the signal receiving unit of the device for enabling utilising these data in the estimates over the necessary pressures and gas amounts in the gas chambers of the device required to obtain the intended heave compensating characteristics during the lifting operation. This is especially advantageous for being able to effectively compensating for the relatively huge pressure increases in the surroundings during lifting operations where a load is to be deployed in deep water.

In another embodiment, the invention according to the first aspect may advantageously also include a signal emitter and receiver for being able to transfer guidance signals from an operator and/or another external guidance unit to the data processing unit of the control unit of the device, and/or passing information of the state of the device to an external guidance unit and/or operator. The transmission may be wire-less, such as a radio signal, or via a wired connection.

The device according to the first aspect of the invention may include one, two or any combination of the above given alternative embodiments, i.e. include a by-pass conduit with a pressure compensating valve over one or more of the first, second, third, and/or fourth valve, a pressure and temperature sensor which measures the pressure and temperature of the surroundings of the device, and a signal emitter and receiver.

The heave compensating effect of the heave compensating device is associated to the ability of the slide-able piston to move inside the length extension device, which in this example embodiment is a result of a piston cylinder and the complementary pressure forces arising inside the unit and acts on the piston as a consequence of its movement. When the piston is moved downwards in the cylinder of the length extension device, liquid will flow out of the first liquid filled chamber and into the second liquid filled chamber, and thus press the slide-able piston of the gas accumulator upwards such that the volume of the gas filled chamber of the gas accumulator becomes reduced. The opposite movement of the piston causes liquid to flow into the first liquid filled chamber, which in a similar manner, results in an increase of the volume of the gas filled chamber of the gas accumulator.

Due to the compression resistance of the gas, the gas will exhibit a counter-acting force on the slide-able piston when it moves downwards (towards the second end 3) which increases with increasing compression degree/stroke length. At the opposite movement of the piston, when it moves upwards (towards the first end 2), the volume of the gas will decrease such that its counter-force against the piston diminishes with the stroke length of the piston. Together this results in a springy effect on the piston (both in the gas accumulator and in the length extension device) which is proportional to the stroke length from its equilibrium position.

By installations on the sea bed, it may be advantageous to vary the dampening characteristics of the heave compensating device to a less stiff spring resistance before the installation reaches the sea bed. This may be obtained by increasing the volume of the gas phase exhibiting the resistance on the second slide-able piston, and may easily be obtained by the heave compensating device according to the invention by opening the valve of the first gas outlet and the second gas outlet to connect the at least one first gas filled chamber of the gas accumulator together with the expansion chamber of the at least one gas tank.

The spring resistance, i.e. the size of the compression resistance of the gas, depends on the compression degree of the gas, which is a function of the available gas volume in the device. The bigger available volume for the gas, the less the compression or the expansion degree becomes at the same stroke length, and thus the softer the spring resistance becomes. One option for increasing the available volume for the gas phase being compressed by the movements of the piston of the gas accumulator is to allow the gas to flow freely into the gas tank. By use of several gas tanks in the same unit, one may regulate the spring resistance in several steps by making one or more gas tanks available for the gas. Alternatively, or in combination with use of several gas tanks, is may be employed two or more gas accumulators which selectively may be engaged to provide the desired gas expansion volume by opening or closing the liquid supply from the length extension device to the gas accumulator. A gas changing its volume under adiabatic or close to adiabatic conditions will change its temperature and pressure according the gas equation of state. In this manner, adjusting the amount of gas and/or available gas expansion volume may be utilised for changing the dampening characteristics and/or the equilibrium position of the slide-able piston. This form of regulation requires that the heave compensator comprises at least one length extension device, at least one gas accumulator, and at least one gas tank fluidly connected to each other with adjustable valves as shown schematically in FIG. 2, and means for selective engagement of the valves which provides the desired dampening characteristic and/or regulation of the equilibrium position of the piston. Thus it is the amount of gas in the gas accumulator(s) and/or gas tank(s) of the device, and which portion of these units' volume that are made available for the gas to distribute itself in, that regulates the heave compensating and/or dampening spring effect of the heave compensating device.

A gas changing its volume under adiabatic or close to adiabatic conditions will change its temperature and pressure according the gas equation of state. Thus, by measuring the pressure and/or the temperature of the gas in the upper gas chamber, it becomes possible if the amount of present gas is known, to determine the volume of the chamber, or if the volume of the chamber (the position of the slide-able piston) is known, the amount of gas may be determined from the knowledge of the pressure and temperature of the gas. The latter may be utilised for automatically regulation of the stroke length of the piston of the length extension device without knowing the exact weight of the load, by determining the actual equilibrium position of the piston and thereafter how the equilibrium position needs to be adjusted in order to obtain an equilibrium position of the piston being approximately in the middle of the inner space of the length extension device. And then determine how much gas which eventually must be discharged from the upper chamber of the gas accumulator to obtain the desired equilibrium position of the piston.

I an second aspect, the invention relates to a method for regulating the available stroke length of a heave compensating device during lifting of a load by a lifting device, where the heave compensating device comprises:
  a length extension device having an upper vacuum chamber and a lower liquid filled chamber due to a slide-able piston having a piston rod which stretches through the liquid filled chamber and further out a distance through a fluid tight opening in the lower end of the length extension device and ends in a releasable attachment device, and
  an elongated gas accumulator having an upper chamber and a lower liquid filled chamber divided by slide-able piston, and where the lower liquid filled chambers of the length extension device and the gas accumulator are fluidly connected to each other by a liquid transferring device, and where the upper chamber has a, with a first valve, adjustable gas outlet,
where the method comprises:
  introducing a sufficient amount of gas in the upper chamber of the gas accumulator to form a pressure which at least is able to obtain an intended equilibrium position of the piston of the length extension device when the full sensible weight of the load is pulling on the piston rod, and thereafter closing the first valve of the gas outlet, and
  arranging the heave compensating device between a lifting device and a load that is to be lifted by attaching the upper end of the length extension device to the lifting device and the load to the attachment device of the piston rod, characterised in that the method additionally comprises the following steps in successive order:
  A) controlling that the first valve of the gas outlet of the gas accumulator is closed, and await reception of signal to initiate the regulation of the available stroke length,
  B) measuring the actual equilibrium position, $S_0$, of the piston of the length extension device at this moment,
  C) measuring the pressure and temperature of the gas inside the upper chamber of the gas accumulator, and utilise a gas equation of state and the actual equilibrium position, $S_0$, to determine the amount of gas, $m_0^{acc}$, present in the chamber at this moment, and determine thereafter the amount of gas, $m_{sp}^{acc}$, required in the upper chamber to achieve the intended equilibrium position, $S_p$, of the piston and determine thereafter $\Delta m_{sp} = m_0^{acc} - m_{sp}^{acc}$, and
  D) if $|\Delta m_{sp}| < K$, where K is a predetermined stop criterion, return to step A), or if $|\Delta m_{sp}| > K$, go to next step E),
  E) if $\Delta m_{sp} > 0$, execute the following sub-steps i) up to and including k):
    i) opening the first valve of the gas outlet of the upper chamber of the gas accumulator,
    j) measuring continuously the pressure, $p_k^{acc}$, and the temperature, $T_k^{acc}$, of the gas in the upper chamber of the gas accumulator, and employ this measured values $p_k^{acc}$ and $T_k^{acc}$ in the gas equation of state to continuously determining the amount of gas, $m_k^{acc}$, present in the upper chamber, and for continuously determining $\Delta m_{sp} = m_k^{acc} - m_{sp}^{acc}$,
    k) if $|\Delta m_{sp}| < K$, close the first valve of the gas outlet of the upper chamber of the gas accumulator, and return to step A).

The load will exhibit a pulling force which is proportional to the mass of the load on the slide-able piston of the length extension device and which seeks to pull the piston downwards toward the other end. The fluid pressure of the liquid in the first liquid filled chamber needs thus to be adjusted to the pulling force induced by the load to enable the length extension device to function as intended. If the fluid pressure is too low, the load may pull the piston too far against and in the worst case even make it butting against the second end, and opposite, if the pressure is too high the piston may be pushed upwards and in the worst case butting against the first end of the length extension device. An optimal functioning of the length extension device relates to an equilibrium position of piston at about the middle of the inner space of the length extension device.

A problem associated with lifting large installations etc. is that there may be significant discrepancies between the real and calculated mass and/or between real and calculated buoyancy of the installation when lowered into the sea. It is thus advantageous if the heave compensating device may automatically regulate the position of slide-able piston inside the length extension device to maintain a satisfactory stroke length without being dependent upon knowing in advance the approximately correct mass and/or buoyancy of the load. In other words, it is advantageous if the device may automatically correct for changes the sensible weight of the load more or less independent of the size of the variations.

The method according to the second aspect of the invention may automatically regulating the available stroke length of the piston of the length extension device as long as there is sufficient available amounts of gas in the upper chamber of the gas accumulator to prevent that the sensible weight of the load pulls the piston of the length extension device sufficiently down that its equilibrium position becomes below the intended equilibrium position. This may easily be obtained by ensuring that it is introduced a surplus of gas with good margins in the upper chamber of the gas accumulator before the lifting operation is initiated. The term "to introduce a sufficient amount of gas" is in this context to be understood as introducing a surplus of gas to the upper chamber which ensures that the load becomes unable to pull the piston below the intended equilibrium position when the full weight of the load is pulling in the piston rod. The sufficient amount gas in the expansion tank of the gas tank depends on the mass of the load, the Response Amplitude Operator (RAO) of the vessel, and the characteristics of the crane, and needs to be determined for each lifting operation. However, this determination is a task within the ordinary skills of a person skilled in the art.

In another embodiment, the method according to the second aspect of the invention, is characterised in that:
the heave compensating device further comprises:
    a reserve gas tank comprising a pressure resistant container containing an adjustable heat source and a thermally degradable compound in liquid or solid state, and which is in fluidly connection to the upper chamber of the gas accumulator by a, with a valve, adjustable reserve gas transmission device,
and
    step A) further comprises controlling that the valve of the reserve gas reservoir is closed and that the adjustable heat source is turned off, and
    step E) further comprises the following sub-steps:
or if $|\Delta m_{sp}|>K$ and $\Delta m_{sp}<0$, execute the following sub-steps 1) up to and including n):
    l) opening the valve of the reserve gas transmission device and turn on the adjustable heat source,
    m) measuring continuously the pressure, $p_k^{acc}$, and the temperature, $T_k^{acc}$, of the gas in the upper chamber of the gas accumulator, and employ the measured values $p_k^{acc}$ and $T_k^{acc}$ in the gas equation of state to determining the amount of gas, $m_k^{acc}$, present in the upper chamber, and determine continuously $\Delta m_{sp} = m_k^{acc} - m_{sp}^{acc}$,
    n) if $|\Delta m_{sp}|<K$, where K is a predetermined stop criterion, close the valve of the reserve gas transmission device, turn off the adjustable heat source, and return to step A).

This second example embodiment of the invention according to the second aspect of the invention may obtain an automatic regulation of the available stroke length also in cases where there is pre-stored too little gas inside the upper chamber of the gas accumulator to retain the full weight of the load. Such situations may arise due to miscalculations of the mass of the load or by a gas leakage in the heave compensating device etc.

Alternatively the heave compensating device may include a gas tank loaded with gas under sufficiently high pressure and which is adjustably in fluid connection with the upper chamber of the gas accumulator for functioning as a gas reserve on demand. This solution is more flexible and applicable since it may more rapidly supply gas to the upper chamber of the gas accumulator, and in that the gas tank may function both as reserve gas storage, as expansion volume for the gas if adjustment of the dampening characteristics is desired, and as accumulation storage for gas being discharged from the upper chamber of the gas accumulator. A heave compensating device utilising both a gas accumulator and gas tank becomes thus a much more flexible heave compensating device able to perform additional different functionalities.

One useful function is use of the gas tank as storage facility for gas from the gas accumulator when lowering a load into great water depths. When lowering a load into water there may arise relatively huge variations in the pulling force from the load (the sensible weight of the load) on the first slide-able piston due to the reduction in the sensible weight resulting from the buoyant force of the water when the load comes into contact with and is lowered into the water masses, and due to the increasing hydrostatic pressure of the water masses as the load is lowered to increasing water depths since the increasing hydrostatic pressure of the water causes an increasing pressure force pushing against the opening at the second end of the length extension device. This pressure force arising from the hydrostatic water pressure seeks to push the means for mechanical attachment of the first slide-able piston to the load, which in some example embodiment is the piston rod, inwards into the length extension device, and may at great water depths constitute a considerable pushing force. It is thus a need for being able to adjust the pressure of the liquid in the first liquid filled chamber in accordance with the variation of the sensible weight of the load during offshore lifting operations to be able to prevent the stroke length of the piston becomes too small due to the equilibrium position being shifted too close to the first or second end of the length extension device.

In another embodiment, the method according to the second aspect of the invention, is characterised in that:
the heave compensating device further comprises:
    a gas tank having an expansion chamber fluidly connected to the upper chamber of the gas accumulator by a, with a second valve, adjustable gas outlet, where the gas outlet of the gas tank is fluidly connected to the gas outlet of the gas accumulator by a gas transmission device, and
    a, with a third valve, adjustable gas outlet to the environment fluidly connected to the gas transferring device,
and where the method further comprises:
    introducing a sufficient amount of gas to the expansion chamber of the gas tank to obtain at least the same high gas pressure in the expansion chamber as in the upper chamber of the gas accumulator, and closing the second valve, and where
    step A) further comprises controlling that the second valve gas transmission device and the third valve of the gas outlet are turned off, and
    step C) further comprises measuring the pressure, $p_k^{ext}$, of the external fluid surrounding the heave compensating device, and
    if $p_k^{acc}<K_{deep}$, where $K_{deep}$ is a pre-determined threshold value:
        sub-step i) additionally comprises opening the third valve of the gas outlet, and
        sub-step k) additionally comprises closing the third valve of the gas outlet,
    or if $p_k^{acc}>K_{deep}$:
        sub-step i) additionally comprises opening the second valve of the gas tank, and
        sub-step k) additionally comprises closing the second valve of the gas tank.

If the load is an installation or other cargo which is to be deployed on the sea bed, the hydrostatic pressure of the sea water induces an increasing pressure against the opening at the second end of the length extension device. This pressure exerts a force on the first slide-able piston which needs to be compensated in order maintain an optimum stroke length of the heave compensating device. The static pressure of the sea water is also exerting a pressure on the third gas outlet, and thus removing gradually the ability of the heave compensating device to release the gas pressure in the first gas filled chamber of the gas accumulator by discharging gas through the gas outlet. This should normally also be taken into account when a load is to be lowered to great water depths where the static water pressure may reach several atmospheres pressure. A solution of this, according to the present invention, is to let the software of the control unit containing instructions which, at the end of the splashing zone, empties the gas in the expansion chamber of at least one gas tank of sufficient to lower the gas pressure in the expansion chamber to the pressure necessary for regulating the equilibrium position of the piston to the desired position at the end phase of the lift (at deep water). In this way, it is obtained that the capacity of the expansion chamber to receive from the first gas filled chamber is maximised. This effect may be increased by using more than one gas tank connected to each gas accumulator by a gas manifold.

In case of lowering a load to deep water depths, it may thus be necessary to make the gas tank ready, or to make at least one gas tank ready if the device uses several gas tanks, by lowering the gas pressure in the gas tank(s) to a lower pressure than the counterpressure required in the gas accumulator to regulate the equilibrium position at great water depths before or shortly after the device is lowered into the water masses and becomes surrounded by water with a high hydrostatic pressure.

In another embodiment, the method according to the second aspect of the invention is characterised in that the method further comprises the following process steps: before step A):

A0) controlling that the first, second and third valve is closed and await reception of signal to initiate the pressure regulation of the gas tank, and go thereafter to step F, and after step E):

F) execute the following sub-steps o) up to and including s):
  o) measuring continuously the pressure and temperature of the gas in the expansion chamber of the gas tank, >
  p) determining the desired pressure of the gas in the expansion chamber according to a pre-determined estimate of the sensible weight of the load at the intended water depth and calculate which gas pressure is required in the upper chamber of the gas accumulator in order to balance pulling force on the piston of the length extension device resulting from this sensible weight of the load,
  q) opening the second valve of the gas outlet of the gas tank and the third valve of the gas outlet to the surroundings, and
  r) when the pressure of the gas phase in the expansion tank has reached the desired pressure, close second valve of the gas outlet of the gas tank and the third valve of the gas outlet to the surroundings, and
  s) return to step A).

The signal for initiating the pressure regulation in the gas tank may be transmitted from an external source by use of a signal transmission system, such as i.e. a radio signal from an operator etc. or it may be produced automatically by the heave compensating device by i.e. measuring the pressure of the surroundings and produce the control signal when a certain water depth is obtained.

The function of the stop criteria, K, is to stop the regulation of the equilibrium position of the piston of the length extension device, and may be any threshold value which provides an acceptable adjustment of the equilibrium position of the piston. In practice, K may advantageously be: $K=\alpha \cdot m_k^{acc}$, hvere $\alpha \epsilon <0.01, 0.2>$. $m_k^{acc}$ is the gas pressure in the upper chamber of the gas accumulator at the actual moment of time.

The function of the stop criteria, $K_{deep}$, is to stop the ventilation of gas from the upper chamber of the gas accumulator. This is a need which arises gradually when lowering the heave compensating device into water (or other liquid), and will normally be a problem when the environmental pressure has reached about 50% of the gas pressure of the upper chamber of the gas accumulator. Thus, it is advantageous to make this transition before the environmental pressure reaches this level. Therefore, in practice, it may advantageously be; $K_{deep}=\beta \cdot m_k^{acc}$, hvere $\beta \epsilon <0.01, 0.5>$. $m_k^{acc}$ is the gas pressure in the upper chamber of the gas accumulator at the actual moment of time.

At offshore lifting operations, the heave compensating device will in many cases be subject to cyclic water wave induced stretching forces making the piston to swing more or less cyclic above an equilibrium position inside the length extension device. The term "equilibrium position" as used herein, is the position that the slide-able piston would attain inside the length extension device if the load is freely suspended without any movements and the lifting vessel is laying still without any type of movements that results in heave movements on the lifting device or load. For determination of the piston of the length extension device, the device according to the invention may advantageously include a signal treatment unit which filtrates away cyclic movements such as wave motions in the signal from the position of the length extension device in order to estimate the equilibrium position of the piston independently of which wave movements or other more or less stochastic movements of the piston. In practice, this may be achieved by measuring and registering the position, $S_i$, of the slide-able piston of the length extension device at a series of time moments across a pre-determined time interval, and employing these measured positions to determine the real equilibrium position, $S_0$, of the piston in this time interval as described above. The time interval may advantageously comprise two or more cycles of the wave movements the heave compensating device is exposed to.

The signal treatment unit may advantageously also include a filter which reduces/removes signal noise in the signals from one or several of the first, second, third, and fourth pressure and temperature sensor. The signal treating unit may apply any known signal filtration technique for this purpose, such as a low-pass filter with subsequent signal calibration and thereafter a Kalman filter for finding the equilibrium position and/or to reduce signal noise. The signal treating unit would usually be located between the signal receiving unit and the data storage memory and between the signal receiving unit and the data processing unit of the control unit, for feeding these components with the estimated equilibrium position and/or "cleaned" pressure and temperature data.

The term "continuous" as used in this context is not to be understood in the mathematical sense of the term as continuously connected without the slightest interruption. Continuous as used in this context means a satisfactorily tightly connected series of measurements made at sufficiently small intervals to form a timely correct and representative picture of the variation of the variable being measured. How close the point measurements/registrations need to be performed to obtain this, depend on how rapidly i.e. the pressure or temperature changes in the gas phases of the heave compensating device. The determination of this in each case is within the ordinary skills of a person skilled in the art.

In other embodiments the heave compensating device according to the first and/or the second aspect of the invention comprise more than one length extension device, each having a slide-able piston and which are arranged in parallel side-by side. The means for mechanical attachment of the slide-able piston to the load of each of the length extension devices may advantageously be mechanically connected to each other, such that the slide-able piston in each length extension device, at all times, has the same position and such that it is the combined effect of the pistons which constitutes the heave compensating effect of the unit. There is no upper limit on the number of length extension devices which may be applied in a heave compensating device according to the invention. However, in practice, there will normally be applicable with one, two or four length extension devices arranged in parallel side-by-side of each other. In cases where the length extension device is a cylinder having a slide-able piston, the interconnection of the means for mechanical attachment of the first slide-able piston of each length extension device and the suspended load be obtained by mechanically connecting the piston rod of the two or more cylinders to each other at the second end (the opposite end of the end attached to the slide-able piston) by i.e. a mechanical bridging construction attached to each piston rod. In this case, the attachment means for attaching the load may be arranged the bridging construction.

In the same manner, there is no upper limit on the number of gas accumulators that may be applied. It is envisioned using an optional number of gas accumulators from one an upwards where the liquid outlet of each gas accumulator is fluidly connected to the liquid outlet of at least one length extension device in the heave compensator. In practice, the number of gas accumulators is usually from one to four for each length extension device being applied in the invention.

It may likewise be applied more than one gas tank which is fluidly connected to one or more gas accumulator of the heave compensator. Each gas tank has a gas outlet with a valve with activation means. In the case of two or more gas tanks, the regulation of gas to and from the gas tanks may advantageously be obtained by a gas manifold which fluidly connects every gas outlet of the gas tanks and gas accumulator(s) to each other. This provides a very flexible link-up allowing using any combination of one or more gas tanks together with one or more gas accumulators for regulating the amount of active gas in the system and/or available gas expansion volume. In this manner it is obtained a possibility of fluidly connecting from none to every expansion chamber with a number from one to every gas filled chambers of the device.

The invention is not limited to this cylinder based example embodiments of a length extension device and/or gas accumulator. It is envisioned other designs of these devices with inner chambers designed as quadratic parallelepipeds, rectangular parallelepipeds, polygonal parallelepipeds etc.

The invention claimed is:

1. A heave compensating device for compensating heave movements between a lifting device and a load lifted by the lifting device, the heave compensating device comprising:

an elongated length extension device comprising:
  side walls;
  a closed upper end;
  a lower end having an opening for a piston rod and a liquid outlet;
  an inner space divided by a first slide-able piston into an upper vacuum chamber and a first lower liquid filled chamber;
  a piston rod of a length at least equal to a length of the length extension device, wherein one end of the piston rod is attached to the first piston, and wherein the piston rod stretches through the first lower liquid filled chamber and further out through the opening in the lower end of the length extension device;
  means arranged at the second end of the piston rod for releasable attachment of the load; and
  means arranged at the upper end of the length extension device for releasable attachment of a lifting device;
an elongated gas accumulator comprising:
  an upper end having a first adjustable gas outlet, the first adjustable gas outlet having a first valve;
  a lower end having a liquid outlet; and
  an inner space divided by a second slide-able piston into an upper chamber and a second lower liquid filled chamber;
a regulated liquid transferring device fluidly connected to the liquid outlet of the length extension device and the liquid outlet of the gas accumulator;
activation means for selective opening or closing of the first valve;
a first and second measuring means for measuring a temperature and/or a pressure of the liquid in at least one of the first and second liquid filled chambers and the gas of the upper chamber of the gas accumulator;
a third measuring means for measuring the position of the first piston;
a reserve gas tank comprising:
  a pressure resistant container containing an adjustable heat source and a thermally degradable compound in liquid or solid state; and
  an adjustable gas transmission device fluidly connected to the upper chamber of the gas accumulator, the adjustable gas transmission device having a second valve; and
a control unit comprising:
  means for registering the measured temperatures and/or pressures of the liquid in one or both of the first and second lower liquid filled chambers and the gas in the upper gas filled chamber of the gas accumulator and for registering the position of the first piston;
  means for calculating a real equilibrium position of the first piston from the registered temperatures and/or pressures and the registered positions of the first piston;
  means for calculating the amount of gas that needs to be ventilated out of the first gas outlet in order to obtain an intended equilibrium position of the first piston; and
  engaging means for engaging the activating means of the first valve of the first gas outlet such that the intended amount of gas exits through the first gas outlet and the first piston obtains the intended equilibrium position.

2. The heave compensating device according to claim 1, further comprising:

a gas tank comprising:
  an upper end having a second adjustable gas outlet, the second adjustable gas outlet having a third valve;
  a closed lower end; and
  an expansion chamber;
a fourth measuring means for measuring the temperature and/or pressure of the gas in the expansion chamber of the gas tank;
a gas transferring device fluidly connected to the first and the second adjustable gas outlets;
a third adjustable gas outlet that opens to an environment surrounding the heave compensating device and connected to the gas transferring device, the third adjustable gas outlet having a fourth valve; and
activation means for selective opening or closure of one or both of third valve and the fourth valve,
wherein the means of the control unit for registering the measured temperatures and/or pressure and the position of the piston in the length extension device, are a signal receiver unit receiving the signals from the first, second, third, and fourth measuring means and a data storage memory,
wherein the means of the control unit for calculating the equilibrium position of the first piston comprises a data processing unit containing computer software with instructions, wherein when the instructions are executed, the data processing unit calculates the actual amount of gas present in the upper gas filled chamber of the gas accumulator and/or the expansion chamber of the gas tank by use of a gas equation of state and the registered temperatures and pressures,
wherein the engaging means of the control unit for engaging the activation means comprises a signal transmission unit for transmission of guidance signals to the activation means of one or more of the first, second, third, or fourth valve, and
wherein the data processing unit of the control unit contains one or more computer software modules each having a set of instructions that calculate, according to a desired compensation functionality, a desired amount of gas in the upper gas filled chamber of the gas accumulator and/or a desired amount of gas in the expansion chamber of the gas tank and that activate the engaging means of the control unit such that the desired amount of gas in the upper gas filled chamber of the gas accumulator and/or the expansion chamber of the gas tank is obtained.

3. The heave compensating device according to claim 1, wherein:
  the length extension device is an elongated cylinder having an elongated inner space;
  the elongated cylinder is closed on an upper end and has an opening on a lower end that is opposite the upper end;
  the first piston is located in the elongated inner space of the elongated cylinder;
  the means for attachment of the length extension device to the lifting device comprises a hook located on an outside of the upper end of the elongated cylinder;
  the elongated cylinder further comprises the piston rod arranged in parallel with a centre axis of the elongated cylinder;
  the piston rod in one end is mechanically attached to the first piston;
  the piston rod extends from the first piston out through the opening in the lower end of the elongated cylinder and a distance further below,
  another end of the piston rod has attachment means for releasable attachment of the load; and
  the opening in the lower end of the elongated cylinder is adapted to form a fluid tight closure around the piston rod.

4. The heave compensating device according to claim 1, wherein the gas accumulator is an elongated cylinder with an elongated inner space that is divided by the second piston into the gas filled upper chamber and the second lower liquid filled chamber.

5. The heave compensating device according to claim 2, wherein at least one of the first adjustable gas outlet, the second adjustable gas outlet, or the third adjustable gas outlet has a by-pass conduit across the first, third, or fourth valve of the conduit equipped with a pressure compensating valve with activation means that are engaged individually by the signal transmission unit of the control unit.

6. The heave compensating device according to claim 1, wherein the third measuring means is a position sensor that registers the position of the first piston.

7. The heave compensating device according to claim 2, wherein the first, second, and fourth measuring means are a first pressure and temperature sensor, a second pressure and temperature sensor, and a third pressure and temperature sensor, respectively.

8. The heave compensating device according to claim 7, wherein the heave compensating device further comprises:
  a fourth pressure and temperature sensor measuring the pressure and/or temperature of the environment surrounding the heave compensating device.

9. The heave compensating device according to claim 8, wherein the control unit further comprises:
  a signal treatment unit comprising:
    a filter that reduces or removes signal noise in the signals from one or more of the first, second, third, and fourth pressure and temperature sensor; and
    a filter that filters out cyclic movements in the signal from the third measuring means that is a position sensor and estimates the equilibrium position of the first piston.

10. The heave compensating device according to claim 2, wherein the control unit further comprises:
  a signal transmitter/receiver that enables transmitting control signals to and from the data processing unit of the control unit of the heave compensating device; and
  an external guidance unit or an operator.

11. The heave compensating device according to claim 1, wherein the thermally degradable compound is a cryogenic fluid in liquid phase, wherein the cryogenic fluid may be one of liquid air or liquid nitrogen.

12. A method for regulating the available stroke length of a heave compensating device during lifting of a load by a lifting device, wherein the heave compensating device comprises:
  a length extension device having an upper vacuum chamber and a first lower liquid filled chamber due to a first slide-able piston having a piston rod that stretches through the first lower liquid filled chamber and further out a distance through a fluid tight opening in a lower end of the length extension device and ends in a releasable attachment device; and
  an elongated gas accumulator having an upper chamber and a second lower liquid filled chamber divided by a second slide-able piston, wherein the first and second lower liquid filled chambers are fluidly connected to each other by a liquid transferring device, and wherein the upper chamber of the gas accumulator has a first adjustable gas outlet, the first adjustable gas outlet having a first valve;
the method comprising:
introducing a sufficient amount of gas in the upper chamber of the gas accumulator to form a pressure such that the first piston obtains an intended equilibrium position when the full sensible weight of the load is pulling on the piston rod, and thereafter closing the first valve;
arranging the heave compensating device between a lifting device and a load that is to be lifted by attaching the upper end of the length extension device to the lifting device and the load to the attachment device of the piston rod,
controlling that the first valve is closed, and awaiting reception of a signal to initiate a regulation of an available stroke length;
measuring the actual equilibrium position ($S_0$) of the first piston;
measuring the pressure and temperature of the gas inside the upper chamber of the gas accumulator, and utilizing a gas equation of state and the actual equilibrium position ($S_0$) to determine the amount of gas ($m_0^{acc}$) present in the upper chamber of the gas accumulator, and determining thereafter the amount of gas ($m_{sp}^{acc}$) required in the upper chamber of the gas accumulator to achieve the intended equilibrium position ($S_p$) of the first piston and determine thereafter $\Delta m_{sp} = m_0^{acc} - m_{sp}^{acc}$; and
if $|\Delta m_{sp}| < K$, where K is a predetermined stop criterion, repeating the method, or if $|\Delta m_{sp}| > K$, continuing the method;
if $\Delta m_{sp} > 0$, execute:
opening the first valve of the gas outlet of the upper chamber of the gas accumulator;
continuously measuring the pressure ($p_k^{acc}$) and the temperature ($T_k^{acc}$) of the gas in the upper chamber of the gas accumulator, and employing the measured values ($p_k^{acc}$) and ($T_k^{acc}$) in the gas equation of state for continuously determining the amount of gas ($m_k^{acc}$) present in the upper chamber of the gas accumulator, and for continuously determining $\Delta m_{sp} = m_k^{acc} - m_{sp}^{acc}$; and
if $|\Delta m_{sp}| < K$, closing the first valve of the gas outlet of the upper chamber of the gas accumulator, and repeating the method.

13. The method according to claim 12, wherein the heave compensating device further comprises:
a gas tank having an expansion chamber fluidly connected to the upper chamber of the gas accumulator by a second adjustable gas outlet, the second adjustable gas outlet having a second valve, where the gas outlet of the gas tank is fluidly connected to the first adjustable gas outlet of the gas accumulator by a gas transmission device; and
a third adjustable gas outlet that opens to an environment surrounding the heave compensating device and that is connected to the gas transferring device, the third adjustable gas outlet having a third valve;
wherein the method further comprises:
introducing a sufficient amount of gas to the expansion chamber of the gas tank to obtain at least the same high gas pressure in the expansion chamber as in the upper chamber of the gas accumulator;
closing the second valve;
controlling that the second valve and the third valve are turned off;
measuring the pressure ($p_k^{ext}$) of an external fluid in the environment surrounding the heave compensating device; and
if $p_k^{acc} < K_{deep}$, where $K_{deep}$ is a pre-determined threshold value:
opening the third valve; and
closing the third valve; or
if $p_k^{acc} > K_{deep}$:
opening the second valve, and
closing the second valve.

14. The method according to claim 12, wherein the method further comprises:
controlling that the first, second, and third valve are closed and await reception of a signal to initiate the pressure regulation of the gas tank;
executing:
continuously measuring the pressure and temperature of the gas in the expansion chamber of the gas tank;
determining the desired pressure of the gas in the expansion chamber according to a pre-determined estimate of the sensible weight of the load at the intended water depth and calculating a gas pressure required in the upper chamber of the gas accumulator in order to balance a pulling force on the first piston resulting from the sensible weight of the load;
opening the second valve and the third valve; and
when the pressure of the gas phase in the expansion tank has reached the desired pressure, close the second valve of the gas tank and the third valve; and
repeating the method.

15. The method according to claim 12, wherein the stop criteria (K) is: $K = \alpha \cdot m_k^{acc}$, where $\alpha \in <0.01, 0.2>$.

16. The method according to claim 12, wherein the stop criteria ($K_{deep}$) is: $K_{deep} = \beta \cdot m_k^{acc}$, where $\beta \in <0.01, 0.5>$.

17. The method according to claim 12, wherein the equilibrium position of the first piston of the length extension device is determined by measuring and registering the position ($S_i$) of the first piston of the length extension device at a series of time moments across a pre-determined time interval, and employing the measured positions to determine the real equilibrium position ($S_0$) in the time interval by statistically filtering out the cyclic movements in the registered positions ($S_i$).

18. The method according to claim 17, wherein the time interval comprises two or more cycles of wave movements that the heave compensating device is exposed to.

19. The method according to claim 13, wherein:
the heave compensating device further comprises:
a reserve gas tank comprising a pressure resistant container containing an adjustable heat source and a thermally degradable compound in liquid or solid state, wherein the reserve gas tank is in fluid connection to the upper chamber of the gas accumulator by an adjustable reserve gas transmission device, the adjustable reserve gas transmission device having a fourth valve; and
the method further comprises:
controlling that the fourth valve of the reserve gas reservoir is closed and that the adjustable heat source is turned off; and
if $|\Delta m_{sp}| > K$ and $\Delta m_{sp} < 0$, execute:
opening the fourth valve of the reserve gas transmission device and turn on the adjustable heat source;
continuously measuring the pressure ($p_k^{acc}$) and the temperature ($T_k^{acc}$) of the gas in the upper chamber of the gas accumulator, and employ the measured values ($p_k^{acc}$) and ($T_k^{acc}$) in the gas equation of state for determining the amount of gas ($m_k^{acc}$) present in the upper chamber, and for continuously determining $\Delta m_{sp} = m_k^{acc} - m_{sp}^{acc}$;

if $|\Delta m_{sp}| < K$, where K is a predetermined stop criterion, closing the fourth valve of the reserve gas transmission device, turning off the adjustable heat source, and restarting the method.

20. The method according to claim 19, wherein the thermally degradable compound is a cryogenic fluid in liquid phase, and wherein the cryogenic fluid is one of liquid air or liquid nitrogen.

* * * * *